April 27, 1954
R. STEVENSON
2,676,612
IN-LINE HYDRAULIC PRESSURE RELIEF
VALVE WITH REVERSIBLE FLOW
Filed May 13, 1952
2 Sheets-Sheet 1
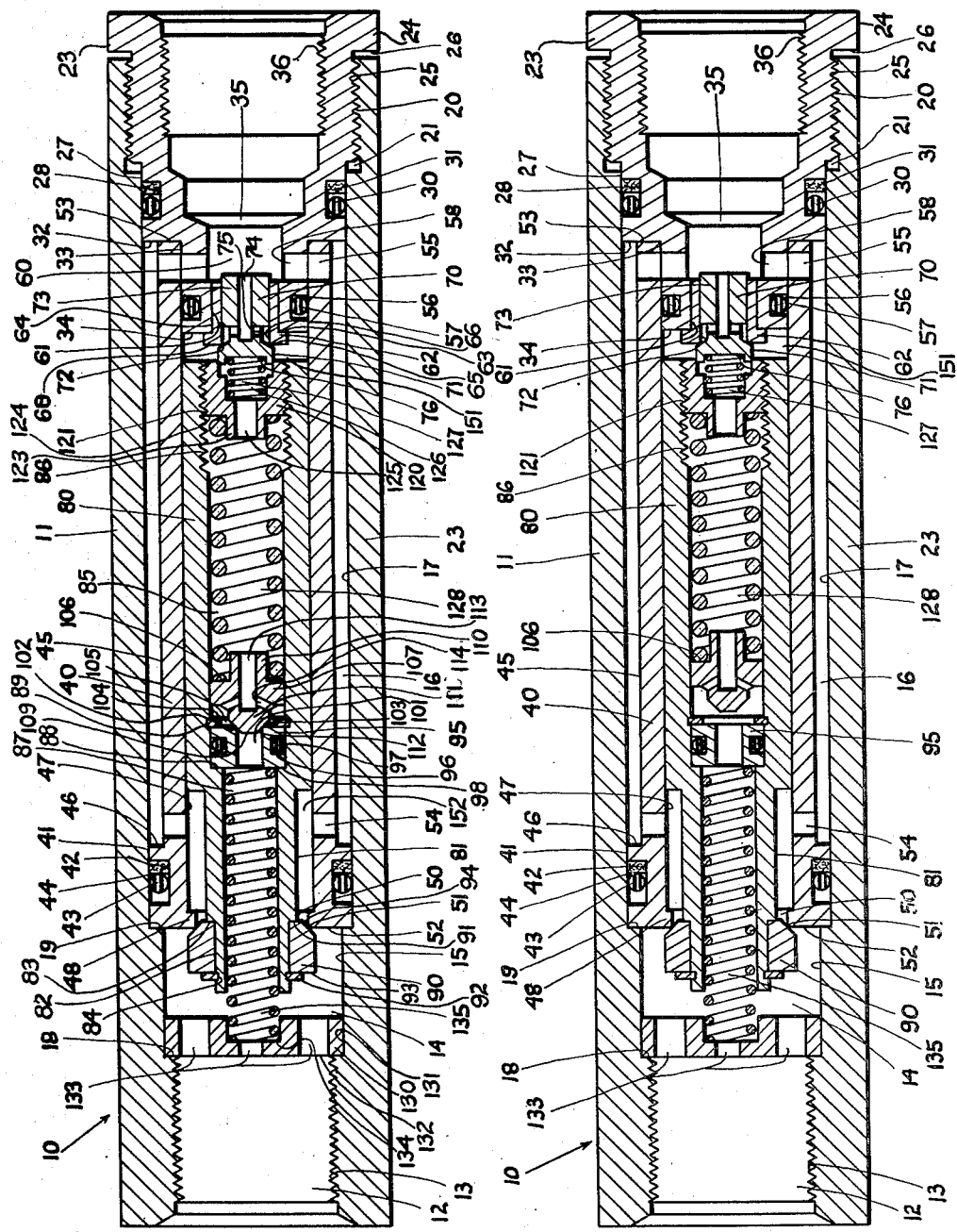
INVENTOR.
ROBERT STEVENSON
BY
William Frederick Kremer
ATTORNEY April 27, 1954     R. STEVENSON     2,676,612
IN-LINE HYDRAULIC PRESSURE RELIEF
VALVE WITH REVERSIBLE FLOW
Filed May 13, 1952     2 Sheets-Sheet 2
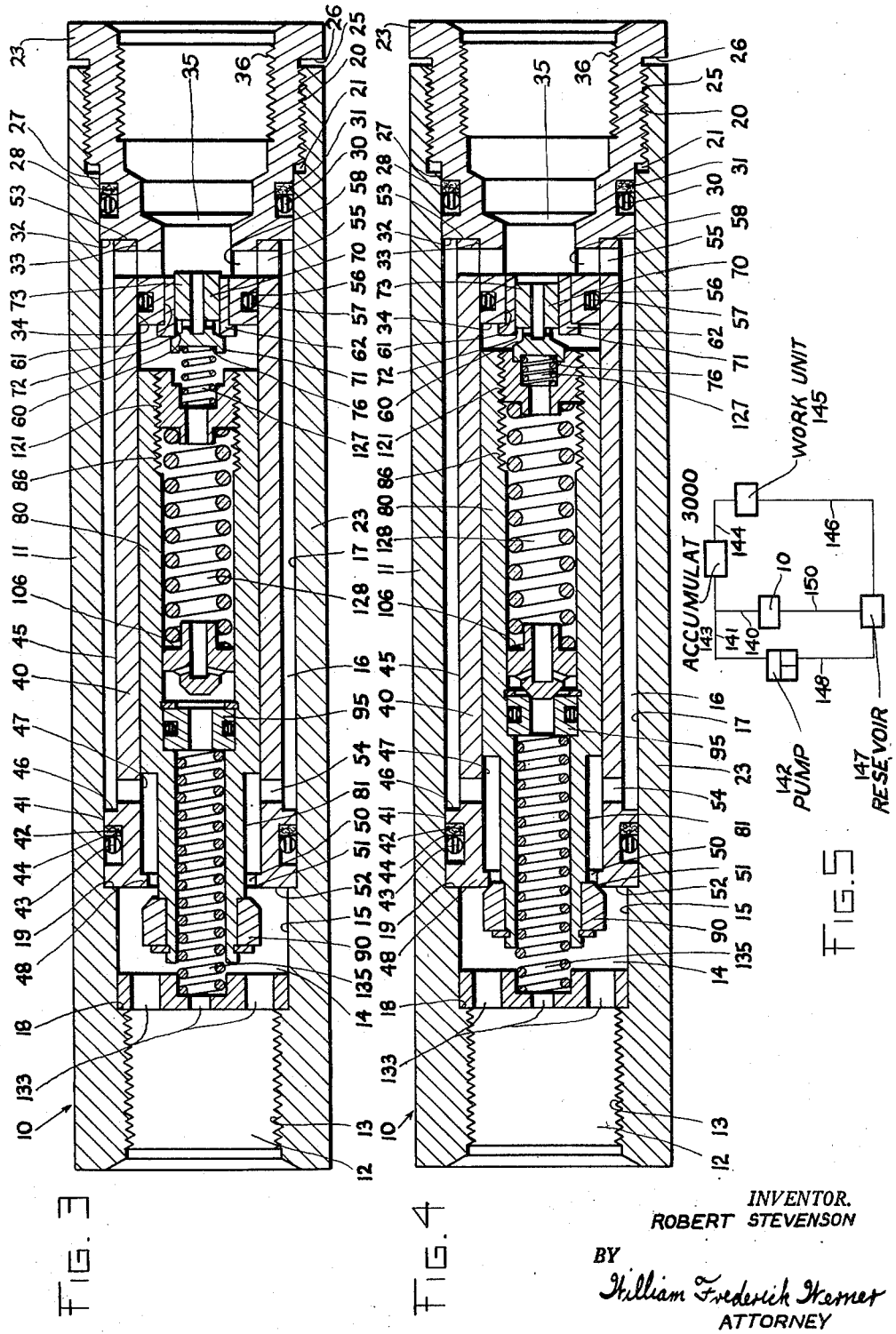
INVENTOR.
ROBERT STEVENSON
BY
William Frederick Werner
ATTORNEY Patented Apr. 27, 1954

2,676,612

UNITED STATES PATENT OFFICE 2,676,612

IN-LINE HYDRAULIC PRESSURE RELIEF VALVE WITH REVERSIBLE FLOW

Robert Stevenson, Barrington, R. I., assignor to Anco, Inc., a corporation of Rhode Island Application May 13, 1952, Serial No. 287,481

6 Claims. (Cl. 137—489)

This invention relates to an in-line hydraulic pressure relief valve with reversible flow such as may be used to control the storing of fluid at a predetermined pressure in an accumulator or the like for operating some work unit.

One of the objects of the present invention is to provide an in-line pressure relief valve for a hydraulic pressure system which satisfies the United States Armed Forces specifications of space, weight, efficiency of operation on pressure control and rate of flow at the outlet over the inlet of the valve.

Another object of the present invention is to provide a pressure relief valve of the in-line type which is particularly adaptable to aircraft because it takes up less space, is lighter in weight and due to efficiency of operation is smaller in area for a given rate of flow.

Still another object of the present invention is to provide a hydraulic pressure relief valve in which fluttering of the port controls is completely eliminated.

Still another object of the present invention is to provide an in-line hydraulic pressure relief valve with a reversible flow feature.

And still another object of the present invention is to provide a hydraulic pressure relief valve which is free flowing, that is, the volume of fluid passing through the outlet side of the valve will be equal to the volume of fluid entering the inlet side of the valve.

With these and other objects in view, the invention consists of certain novel features of construction which will be more fully described and particularly pointed out in the appended claims.

In the past hydraulic pressure relief valves had mechanisms which so filled the housing of the valves as to restrict the area allotted to the fluid, resulting in an oversize valve for a given rate of discharge at the outlet side of the valve over the inlet side of the valve or else the discharge of the fluid was greatly reduced at the outlet side over the flow at the intake of the valve. The present invention overcomes this objection by providing a novel construction allotting a uniformity of area throughout the valve for fluid flow.

In the past hydraulic pressure relief valves responded to pressures fifteen per cent or more of the initial relief setting. The present novel construction admits of between two and three per cent of the initial relief setting while permitting a wider variety of pressure adjustments than was heretofore possible in a single relief valve. Consequently a smoother flowing valve is provided due to quicker response to pressure changes. An action is naturally harsher when it requires a fifteen percent change in pressure before it will function over an action responding to a two percent change.

Like reference numerals refer to like parts in the accompanying drawings in which:

Figure 1 is a longitudinal sectional view of the new and improved in-line relief valve with reversible flow.

Figure 2 is a longitudinal sectional view similar to Figure 1, showing the primary valve away from its seat.

Figure 3 is a longitudinal sectional view, similar to Figure 1, showing the secondary valve away from its seat.

Figure 4 is a longitudinal sectional view, similar to Figure 1, showing the reversible flow control valve away from its seat.

Figure 5 is a diagrammatic view illustrating one use of the in-line hydraulic pressure relief valve with reversible flow.

With reference to the drawing, reference character 10 generally designates the new and improved in-line hydraulic pressure relief valve with reversible flow consisting of an aluminum cylindrical body 11, having a central bore throughout its length comprising an inlet 12 constructed so as to be readily attachable to a fluid conduit with a fluid tight connection. The construction shown including threads 13 is a United States Military specification. Adjacent inlet 12 is a cavity 14 formed by cylindrical wall 15 which is a termination of chamber 16 formed by cylindrical wall 17. A ledge 18 is formed between inlet 12 and wall 17 due to their difference in diameters. A threaded area 20 is provided in the end of the cylindrical bore opposite inlet 12. A recess 21 is provided between cylindrical wall 17 and threaded area 20 in accordance with good manufacturing practices. A wall 19 is formed between cylindrical wall 17 and cylindrical wall 15.

A gland 23 having an external diameter 24 substantially that of body 11, may be provided with a geometric formation such as a square or hexagonal to facilitate assembling gland 23 into body 11. Adjacent external diameter 24 is a threaded area 25 adapted to cooperate with threaded area 20 of body 11. A wall 26 is formed between diameter 24 and threaded area 25. A sleeve 27 adjacent threaded area 25 is provided with a groove 28 adapted to house fluid tight packing material illustrated as consisting of a neoprene O ring 30 and a back up ring 31 which prevents the extrusion of O ring 30 when said O ring is subjected to extremely high pressure. Sleeve 27, O ring 30 and back up ring 31 are adapted to cooperate with cylindrical wall 17 to form a fluid tight seal under extremely high pressure, including ten thousand pounds per square inch. Adjacent sleeve 27 is a wall 32 terminating in a shoulder 33 and an end 34. Shoulder 33 is provided with a groove 56 adapted to house a fluid tight packing; illustrated as comprising a neoprene O ring 57. Ports 58 are provided in shoulder 33.

Internally, gland 23 consists of an outlet 35 provided with a configuration including threads 36 adapted to form a fluid tight seal when united with a fluid conduit constructed in accordance with United States Military specifications. The left hand end of outlet 35 is provided with a chamber 60 and an axial bore 61.

A bushing 40 provided with a bearing surface 41 having a groove 42 adapted to house fluid tight packing material, illustrated as consisting of a neoprene O ring 43 and a back up ring 44 which prevents extrusion of O ring 43 when said O ring 43 is subjected to extremely high pressure. Bearing surface 41, O ring 43 and back up ring 44 are adapted to cooperate with cylindrical wall 17 to form a fluid tight seal under extremely high pressure. The outside diameter 45 of bushing 40 is smaller than bearing surface 41, therefore a wall 46 is formed between them.

Internally, bushing 40 provides a piston seat 47 for almost its entire length. The left hand end of bushing 40 is provided with an end wall 48 having an axial bore 50 which forms a valve seat 51 in said end wall 48. The base 52 of end wall 48 abuts wall 19. The end 53 of bushing 40 abuts wall 32. Shoulder 33 of gland 23 engages the right hand end of piston seat 47. O ring 57 cooperating with piston seat 47 forms a fluid tight seal. Ports 54 and 55 consisting of a multiple number of orifices in bushing 40 are provided adjacent either end of said bushing 40. The area of ports 54 and 55 being determined by the volume of fluid to flow through said ports 54 and 55. Ports 55 are aligned with ports 58 to form an unobstructed area.

A valve insert 62 provided with a shoulder 63 adapted to abut end 34 and a shank 64 adapted to be secured in axial bore 61 is provided with a valve seat 65 and a valve stem bearing 66. The valve seat 65 is formed at the intersection of valve stem bearing 66 with the valve insert face 68.

A valve plug 70 consists of a head 71 beveled to form a valve plug seat 72 and having valve stem 73 which has a bore 74 and ports 75. Head 71 is provided wtih a spring seat 76.

Valve stem 73 is slidably mounted in valve stem bearing 66 to enable valve plug seat 72 to engage and disengage valve seat 65.

A piston 80 slidably fits in piston seat 47 and is reduced in diameter as at 81 while its extreme end 82 is further reduced in diameter to provide a shoulder 83. End 82 has a groove 84 for purposes, later to be described. A longitudinal bore 85 is provided extending throughout the axial length of piston 80. At its extreme right hand end bore 85 is threaded as at 86. The left hand end of bore 85 is restricted as at 87 providing a shoulder 88 at the intersection of bores 85 and 87. A groove 89 is provided, for purposes later to be described.

A valve plug 90 is secured to end 82 with its face 91 abutting shoulder 83 and a lock ring 92 secured in groove 84 abutting its back 93. A beveled valve face 94 is formed in plug 90 and is adapted to engage valve seat 51.

A valve insert 95 having a groove 96 adapted to house a fluid tight packing, shown as consisting of a neoprene O ring 97 is driven into bore 85 until face 98 of insert 95 abuts shoulder 88. O ring 97 will form a fluid tight connection with the wall of bore 85. An axial passageway 101 provided in insert 95 forms a valve seat 102 at the juncture of passageway 101 and face 103. A lock ring 104 provided with an axial bore 105 is secured in groove 89 abutting face 103.

A valve plug 107 slidably engages longitudinal bore 85 at its largest diameter which is central of its length; with a reduced diameter extending to the right as at 110 and to the left as at 111 with a beveled valve face 112 formed therein. Axially plug 107 is provided with bore 113 and ports 114. Beveled valve face 112 is adapted to engage and disengage valve seat 102 through axial bore 105. A shoulder 106 is formed where the largest diameter terminates to form reduced diameter 111. The area of end 109 is determined by the angle of beveled valve face 112.

A bushing 120 T-shaped is provided with threads 121 in its largest diameter which are adapted to engage threads 86. The shank 123 of the T projects from the largest diameter forming a shoulder 124 therebetween. An axial bore 125 terminating in a spring retainer 126 is provided in bushing 120. A coil spring 127 is housed in spring retainer 126 on one end and in spring seat 76 on the other end. A coil spring 128 housed in bore 85 engages shoulder 106 on one end and shoulder 124 on the other end.

A flow control insert 130 is driven into cavity 14 with its outside diameter 131 engaging wall 15 and its face 132 abutting ledge 18. A series of ports 133 are provided along the longitudinal axis of flow control insert 130, providing the area governing the volume of fluid permitted to pass from inlet 12 to cavity 14. The axial port 133 is provided with a spring seat 134. A coil spring 135 is provided in bore 87 with one end abutting face 98 and the other end housed in spring seat 134.

In operation the in-line hydraulic pressure relief valve with reversible flow 10 (see Figure 5) will be placed in a fluid conduit 140 leading from a fluid conduit 141 connecting pump 142 to an accumulator 143 which has a fluid conduit 144 leading to the work done mechanism 145. A return fluid conduit 146 connects the work done mechanism 145 with a reservoir 147 which completes the cycle by having a fluid conduit 148 connected to pump 142. Relief valve 10 has its outlet connected to a fluid conduit 150 leading to reservoir 147.

Referring to all the figures of the drawing. Fluid from pump 142 flowing, for example, at the rate of six gallons per minute at three thousand pounds per square inch will enter inlet 12, pass through ports 133 into cavity 14 and bore 87. At this point in the operation, let it be assumed that the pump is just bringing the pressure from zero to three thousand pounds per square inch. All the valves, namely, valve plugs 107, 70 and 90 will be seated. See Figure 1.

The fluid will flow into passageway 101 and act against end 109 and beveled valve face 112. Opposing this fluid pressure is spring 128 which is adjustable as to the force it exerts by means of bushing 120 having its threads 121 engaging threads 86 in piston 80. As the force of the fluid overcomes the force of spring 128, beveled valve face 112 will leave valve seat 102, thereby permitting the fluid to flow into bore 85 forward of valve plug 107, through ports 114 and bore 113 in plug 107 into bore 85 behind valve plug 107, into axial bore 125, spring retainer 126 into the space 151 between the end of piston 80 and end 34. As the fluid pressure in space 151 builds up it will force piston 80 to the left (Figures 1 and 2) against the tension of spring 135, thereby moving beveled valve face 94 away from valve seat 51. This action permits the fluid in cavity 14 to flow through axial bore 50 into chamber 152, into ports 54, into chamber 16, through ports 55 and 58 into outlet 35, fluid conduit 150 back into reservoir 147.

It will thus be seen, that at the period of maximum relief, valve 10 provides a large area for the fluid to flow through, while at the same time providing a valve plug 107 with a sensitive feel in adjustable spring 128 for relieving the surges in the fluid pressure. The present construction encompasses a hydraulic pressure relief valve operable on a two percent change in fluid pressure. Such change being controlled on a smooth flow basis, eliminating the fluttering inherent in other pressure relief valves.

The magnitude of the present invention can best be understood when, by way of example, three thousand pounds per square inch pressure is desired in accumulator 143 and relief valve 10 will begin to function at 2940 p. s. i. maintaining the desired accumulator pressure within extremely close ranges.

The reversible flow feature will now be described. Pump 142 is not operating (for any one of many reasons). Pressure in the accumulator 143 is dropping below the desired pressure, as for example, 3000 p. s. i. However, the pressure in reservoir 147 exceeds 3000 p. s. i. This pressure acting through fluid conduit 150, entering outlet 35, enters bore 74 and ports 75, acting on beveled valve seat 72, moving it away from valve seat 65, thereby permitting the fluid to enter chamber 151, and as previously described, force piston 80 to the left, thereby moving valve face 94 away from valve seat 51.

The fluid entering outlet 35 will also pass through ports 58, 55, chamber 16, ports 54, chamber 152, bore 51, cavity 14, ports 133, inlet 12, fluid conduit 140, 141 to accumulator 143. Thereby maintaining the system operable despite a pump failure.

Having illustrated and described one embodiment of the present invention, by way of example, but realizing that structural changes could be made and other examples given without departing from either the spirit or scope of this invention.

What I claim is:

1. In a hydraulic pressure relief valve, a body having a central bore throughout its length comprising an inlet attachable to a fluid conduit, a cavity adjacent said inlet with a ledge formed therebetween, a chamber adjacent said cavity with a wall formed therebetween, a threaded area separated from said cavity by a recess, a gland provided with a threaded area adapted to be united with the threaded area in said body, a sleeve adjacent said threaded area provided with a groove adapted to house a fluid tight packing when cooperating with said chamber in said body, a shoulder adjacent said sleeve with a wall therebetween, a groove in said shoulder adapted to house a fluid tight packing, ports in said shoulder, an outlet attachable to a fluid conduit, an axial bore adjacent said outlet terminating in a counterbored area, a bushing provided with a bearing surface having a groove adapted to house a fluid tight packing when cooperating with said chamber, a diameter adjacent said bearing surface with a wall therebetween, a piston seat terminating in an end wall having a valve seat provided in an axial bore, said end wall abutting said wall between said cavity and said chamber, the opposite end of said piston seat engageable with said shoulder and forming a fluid tight packing when cooperating with the fluid tight packing in the groove in said shoulder, the end of said bushing abutting the wall between said shoulder and said sleeve, ports in both ends of said bushing, the ports of one end engageable with the ports in said shoulder, a valve insert provided with a shoulder adapted to fit in said counterbored area having a shank adapted to be secured in the axial bore of said gland, a valve seat and a valve stem bearing provided in said valve insert, a valve plug consisting of a head beveled to a valve plug seat adapted to cooperate with the valve seat in said valve insert, a stem having a bore and ports, slidably mounted in said valve stem bearing, a spring seat in said head, a piston slidably mounted in said piston seat having a reduced diameter adjacent a further reduced diameter on one end with a shoulder therebetween, a groove in the last of said reduced diameters, a longitudinal bore extending throughout the axial length of said piston with a thread in its right hand end, and a restricted bore in its left hand end having a shoulder at the beginning of said restricted bore and a groove in said longitudinal bore, a valve plug secured to said further reduced diameter abutting said shoulder between said reduced diameters, a spring ring in said groove in the last of said reduced diameters abutting said valve plug, a beveled valve face formed in said valve plug, adapted to engage said valve seat in said bushing, a valve insert having a groove adapted to house a fluid tight packing when cooperating with said longitudinal bore, said valve insert being adapted to be secured in said longitudinal bore with one face abutting said shoulder beginning at said restricted bore, a lock ring in said groove in said longitudinal bore abutting the other face of said valve insert, an axial passageway provided with a valve seat in said valve insert, a valve plug slidably mounted in said longitudinal bore, with a reduced diameter having a beveled valve face adapted to engage said valve seat in said axial passageway, a bore and ports in said valve plug, a bushing provided with threads adapted to engage the threads in said piston having an axial bore terminating in a spring retainer, a spring in said spring retainer engaging said spring seat of said valve plug, a spring in said longitudinal bore engaging said bushing on one end and said valve plug on the other end, a flow control insert secured in said cavity having one face abutting said ledge, provided with ports, a spring seat in one port and a spring in said restricted bore engaging said spring seat on one end and said valve insert on the other end.

2. In a hydraulic pressure relief valve, a body having an inlet provided with means to be secured to a fluid conduit, a cavity adjacent said inlet, a chamber adjacent said cavity, a gland secured in said chamber having means to provide a fluid tight seal therebetween, a shoulder having ports provided in said gland, an outlet in said gland provided with means to be secured to a fluid conduit, a valve insert secured in said outlet having a valve seat and a valve stem bearing, a valve plug slidably mounted in said valve stem bearing having a valve plug seat engageable with the valve seat in said valve insert, a bushing secured in said chamber having means to provide a fluid tight seal therebetween, one end of said bushing engaging said shoulder and having means to provide a fluid tight seal therebetween, ports in said bushing engaging ports in said shoulder, part of the outside diameter of said bushing disengaging said chamber, ports in the end of said bushing away from said first mentioned ports, an end wall in said bushing provided with a valve seat, a piston slidably mounted in said bushing provided with means for securing thereto a valve plug having a valve seat engageable with said valve seat in said bushing, a longitudinal bore throughout the length of said piston, a valve insert secured in said longitudinal bore having means to provide a fluid tight seal therebetween and having an axial bore provided with a valve seat, a valve plug slidably mounted in said longitudinal bore provided with a valve seat adapted to cooperate with the valve seat in said valve insert having a bore and ports, a bushing secured in said longitudinal bore having an axial bore, resilient means interposed between said bushing and said valve plug, resilient means interposed between said bushing and said first named valve plug, a flow control insert secured in said cavity having ports and resilient means located in said longitudinal bore engaging said flow control insert and said valve insert.

3. In an in-line hydraulic pressure relief valve with reversible flow an aluminum body having an inlet provided with means to form a fluid tight seal when connected with a fluid conduit, a cavity adjacent said inlet, a chamber adjacent said cavity, an aluminum gland provided with means to be secured to said aluminum body with a high pressure fluid tight seal, a shoulder projecting from said gland having ports, an outlet in said gland provided with means to form a fluid tight seal when connected with a fluid conduit, a high carbon steel valve insert provided with a valve seat and a valve stem bearing secured in said outlet, a high carbon steel valve plug slidably mounted in said valve stem bearing having a valve plug seat engageable with the valve seat in said valve insert, a high carbon steel bushing provided with a bearing surface having means to form a high pressure fluid tight seal when secured in said chamber, one end of said bushing having means to form a high pressure fluid tight seal when secured to the shoulder projecting from said gland, the other end of said bushing being provided with a valve seat, two sets of ports in said bushing, one set of ports being in aligned engagement with the ports in said shoulder, a high carbon steel piston slidably mounted in said bushing having a reduced diameter secured to a valve plug provided with a valve seat engageable with the valve seat in said bushing, a longitudinal bore throughout the length of said piston, a bushing adjustably mounted in said piston provided with an axial bore, a valve insert having means to provide a high pressure fluid tight seal when secured in said longitudinal bore provided with an axial bore having a valve seat, a valve plug slidably mounted in said longitudinal bore having a valve seat engageable with the valve seat in said valve insert and axially having a bore with ports, resilient means interposed between said valve plug and said adjustably mounted bushing, resilient means interposed between said adjustably mounted bushing and said first mentioned valve plug, a flow control insert secured in said cavity provided with ports and resilient means interposed between said flow control insert and said valve insert.

4. In an in-line hydraulic pressure relief valve with reversible flow a body formed with an axial bore having an inlet in one end and a gland having an outlet secured in the other end, a bushing secured in said axial bore and forming a chamber therewith, ports in said bushing communicating with said chamber on one end and with said outlet on the other end, annular packing rings interposed between said bushing and said axial bore on one end and between said gland and said axial bore on the other end, a piston having an axial passageway and a reduced outside diameter slidably mounted in said bushing, said reduced outside diameter forming a chamber with said bushing, a valve secured to said reduced outside diameter, a valve slidably mounted in said axial passageway, a valve slidably mounted in said outlet, a chamber formed between the end of said piston and the end of said gland, fluid under pressure in said chamber under control of said second valve and said third valve controlling said first valve, all the valves resiliently mounted to yield at a predetermined pressure.

5. In an in-line hydraulic pressure relief valve with reversible flow a body provided with an inlet having an axial bore throughout its length, a bushing secured in said axial bore and forming a chamber therewith, a gland secured in said axial bore provided with an outlet and restricting the length of said chamber, a piston slidably mounted in said bushing forming a chamber with said bushing, a valve on said piston for controlling the fluid flowing into said chamber, ports in said bushing connecting said first chamber with said second chamber, an axial passageway throughout the length of said piston, a valve in said axial passageway controlling the fluid flowing through said axial passageway, a bushing having an axial bore secured in one end of said axial passageway, a chamber formed between the end of said piston and bushing and said gland, a valve slidably mounted in said gland outlet for controlling the fluid entering said last mentioned chamber from said outlet, the fluid in said last mentioned chamber controlling the movement of said second mentioned valve and ports in said gland and said bushing connecting said first mentioned chamber with said outlet and resilient means for each of the three valves controlling the pressure at which the said valves will function.

6. In an in-line hydraulic pressure relief valve with reversible flow, a body having an inlet and a central bore throughout its length, a gland secured in said central bore having an outlet, a chamber adjacent said outlet terminating in an axial bore, a bushing secured in said central bore on one end and secured to said gland on the other end with a chamber formed between the outside diameter of said bushing and said central bore, a valve seat formed in one end of said bushing, a piston slidably mounted in said bushing having a reduced end piston forming a chamber with said bushing, a valve seat secured to said reduced end engageable with said valve seat in said bushing, an axial bore throughout the length of said piston, a valve insert secured in said axial bore, having an axial passageway, a valve seat formed in said axial passageway, a valve plug provided with ports and a valve seat slidably mounted in said axial bore, engageable with said valve seat in said valve insert, a bushing provided with an axial bore secured in said axial bore of said piston, resilient means interposed between said bushing and said valve plug, a valve insert having a valve seat secured in the axial bore of said gland, a valve plug provided with ports and a valve seat slidably mounted in said valve insert, resilient means between said valve plug and said bushing, a flow control insert provided with ports secured in said central bore, resilient means interposed between said flow control insert and said valve insert, ports in either end of said bushing communicating with the chamber formed between said bushing and said body and the chamber formed between the reduced end of said piston and said bushing on one end and with said chamber in said gland on the other end.

References Cited in the file of this patent

UNITED STATES PATENTS

| Number | Name | Date |
|---|---|---|
| 2,555,334 | Green | June 5, 1951 |